United States Patent [19]

Ichioka et al.

[11] Patent Number: 5,533,943

[45] Date of Patent: Jul. 9, 1996

[54] PLANETARY GEAR DEVICE INCLUDING PLANETARY GEARS EACH HAVING INTEGRALLY FORMED LARGE AND SMALL PINIONS

[75] Inventors: Eiji Ichioka; Kinya Yoshii; Takeharu Koide; Mitsuhiro Umeyama, all of Toyota; Makoto Funahashi, Susono; Takashi Shimizu, Toyota; Yoshihiko Sasaki, Okazaki; Masahiro Hasebe, Anjo, all of Japan

[73] Assignees: Toyota Jidosha Kabushiki Kaisha, Toyota; Aisin Aw Co., Ltd., Anjo, both of Japan

[21] Appl. No.: 417,782

[22] Filed: Apr. 6, 1995

[30] Foreign Application Priority Data

Apr. 25, 1994 [JP] Japan ..................... 6-086133

[51] Int. Cl.⁶ ..................................... F16H 37/08
[52] U.S. Cl. .................... 475/198; 475/204; 475/206; 475/221
[58] Field of Search ..................... 475/198, 200, 475/204, 206, 221, 220, 230, 338, 344

[56] References Cited

U.S. PATENT DOCUMENTS

| | | |
|---|---|---|
| 3,721,135 | 3/1973 | Kelley . |
| 3,780,601 | 12/1973 | Dach et al. . |
| 4,969,532 | 11/1990 | Oyama et al. ............. 475/198 X |
| 5,046,997 | 9/1991 | Koivunen ................... 475/221 |
| 5,205,197 | 4/1993 | Kobayashi et al. ......... 475/221 |
| 5,328,419 | 7/1994 | Motl et al. ............... 475/338 X |
| 5,376,057 | 12/1994 | Cooper et al. . |
| 5,415,601 | 5/1995 | Cilano ..................... 475/160 |

FOREIGN PATENT DOCUMENTS

| | | |
|---|---|---|
| 0463895A1 | 1/1992 | European Pat. Off. . |
| 1356792 | 2/1964 | France . |
| 912884 | 4/1954 | Germany . |
| 5332408 | 12/1993 | Japan . |
| 364954 | 11/1962 | Switzerland . |
| 2249364 | 5/1992 | United Kingdom . |

*Primary Examiner*—Charles A. Marmor
*Assistant Examiner*—Peter Kwon
*Attorney, Agent, or Firm*—Oblon, Spivak, McClelland, Maier & Neustadt

[57] ABSTRACT

A planetary gear device including a first gear, a second gear, a carrier, and composite planetary gears each having a large- and a small-diameter pinion that are formed integrally with each other and arranged in the axial direction. The composite planetary gears are mounted rotatably on respective pinion shafts such that the composite planetary gears are axially movable over predetermined distances due to axial plays, and the pinion shafts are supported by the carrier such that the pinion shafts are disposed around an axis of the carrier. The pinions of the composite planetary gears mesh with the first and second gears, respectively. Each of the first and second gears and the pinions consists of a helical gear whose teeth have a helix angle with respect to the axis. The large-diameter and small-diameter pinions have the same direction of helix and the same amount of lead.

8 Claims, 5 Drawing Sheets

PLANETARY GEAR DEVICE INCLUDING PLANETARY GEARS EACH HAVING INTEGRALLY FORMED LARGE AND SMALL PINIONS

BACKGROUND OF THE INVENTION

1. Field of the Invention

The present invention relates generally to a planetary gear device, and more particularly to improvements in a planetary gear device having composite planetary gears each of which has a large-diameter pinion and a small-diameter pinion that are integrally formed with an axial spacing therebetween.

2. Discussion of the Related Art

A planetary gear device is widely used in a power transmitting system or assembly such as a transmission or speed reducing device for a motor vehicle. In one known type of such planetary gear device, a plurality of composite planetary gears are disposed around the axis of a carrier. Each of the composite planetary gears has a large-diameter pinion and a small-diameter pinion which are formed integrally with each other and arranged in the axial direction such that the teeth of the two pinions are spaced apart from each other in the axial direction. An example of this type of planetary gear device is disclosed in EP-A-0 63 895, which is adapted to be used in a power transmitting system of an electric car or vehicle. The use of two such planetary gear devices (each having composite planetary gears) disposed in series connection with each other makes it possible to provide a compact speed reducing system which has a relatively high speed ratio.

The present inventors previously developed a power transmitting system for an electric car, which incorporates such planetary gear device, as shown in FIG. 1. The developed power transmitting system is not publicly known at the time the present invention was made. The planetary gear device, which is indicated generally at 10 in FIG. 1, includes a sun gear 14, a carrier 16, three composite planetary gears 20 disposed on the carrier 16, and a ring gear 24. Each of the composite planetary gears 20 has a large-diameter pinion 26 and a small-diameter pinion 28 which are formed integrally with each other. Three planetary gears 20 are supported by the carrier 16 such that the three planetary gears 20 are arranged along the circumference of the ring gear 24 which has a center at the axis of the carrier 16, that is, at the center of the planetary gear device 10. The three planetary gears 20 are equally spaced apart from each other in the circumferential direction of the ring gear 24. The large-diameter pinion 26 of each composite planetary gear 20 meshes with a first gear in the form of the sun gear 14, while the small-diameter pinion 26 meshes with a second gear in the form of the ring gear 24. The power transmitting system has a hollow motor shaft 12, a rotary motion of which is transmitted to the sun gear 14. With the ring gear 24 functioning as a reaction element, the rotary motion of the sun gear 14 is transmitted to a differential gear device 36 through the carrier 16, such that the speed of the rotary motion of the carrier 16 is reduced at a predetermined ratio with respect to that of the sun gear 14. The rotary motion of the differential gear device 36 is transferred to transmission shafts 56, 58 which are connected to respective right and left wheels of the vehicle.

For reducing an operating noise of such planetary gear device, each of the gears used therein is generally a helical gear whose teeth are twisted obliquely to the axis or have a helix angle. The specifications such as the helix angle of the large-diameter and small-diameter pinions are determined independently of each other, depending upon the required mechanical strength and tooth contact ratio. Where the teeth of the two pinions have the same direction of helix, thrust forces act on the large- and small-diameter pinions in the opposite directions, due to the helix or twisting of the teeth. However, since the specifications of the two pinions are determined independently of each other, the two thrust forces do not completely offset each other, and the composite planetary gear as a whole is forced by the thrust forces in one axial direction. Therefore, the carrier supporting the composite planetary gears is required to have a comparatively high mechanical strength. Further, deflection or deformation of the carrier due to the thrust forces result in a loss of parallelism of the axes of the composite planetary gears and the first and second gears (sun gear and ring gear), which prevents smooth or adequate tooth engagement of these gears, leading to increased noise of the gears and reduced power transmitting efficiency of the planetary gear device.

With the thrust forces acting on the pinions of the composite planetary gears in one axial direction, the transmission of the rotary motion between the composite planetary gears and the carrier takes place while the gears are held in abutting contact with the carrier, namely, while the composite or overall thrust force is received by the carrier. Where the large- and small-diameter pinions have different lead amounts, the composite planetary gears cannot be moved independently of each other. In other words, all the composite planetary gears are synchronously moved together in the axial direction by the composite force. On the other hand, the carrier may have local dimensional errors, which may cause different amounts of axial movements of the individual composite planetary gears until the gears abut on the carrier. In this case, the thrust forces of all the composite planetary gears are not received by the carrier, and one or two of the gears is/are spaced apart from the carrier in the axial direction, whereby the thrust force of this gear or thrust forces of these gears is/are received by the mating first and second gears (sun gear and ring gear). Accordingly, the synchronous axial movements of the composite planetary gears may lead to deterioration of the tooth meshing or engaging condition of the gears, giving adverse influences on the gear operating noise, power transmitting efficiency and strength of the planetary gear device. Similar problems are encountered in the event that the axial movements of some of the composite planetary gears are more or less delayed, or in the event that some of the composite planetary gears are not able to move axially due to sticking, for example.

The planetary gear device 10 of FIG. 1 will be described in detail, by further referring to FIGS. 3 and 4. Where teeth 70, 72 of the large-diameter and small-diameter pinions 26, 28 of each composite planetary gear 20 have a left-hand helix, counterclockwise rotation of the sun gear 14 as seen in the right direction (from the left toward the right) in FIGS. 3 and 4 will cause a thrust force $F_{SS}$ to act on the large-diameter pinion 26 in the right direction as seen in FIG. 4, due to the helix of the teeth 70, while at the same time cause a thrust force $F_{RS}$ to act on the small-diameter pinion 28 in the left direction as also seen in FIG. 4, due to the helix of the teeth 72, as indicated in FIG. 3. The thrust force $F_{SS}$ is represented by $F_S \cdot \tan \beta_S$, where "$F_S$" represents a force which is transferred from the sun gear 14 to the teeth 70 of the pinion 26 in the circumferential direction of the pinion 26, and "$\beta_S$" represents a helix angle of the teeth 70. The thrust force $F_{RS}$ is represented by $F_R \cdot \tan \beta_R$, where "$F_R$"

represents a force which is transferred from the ring gear 24 to the teeth 72 in the circumferential direction of the pinion 28, and $\beta_R$" represents a helix angle of the teeth 72. Since the helix angles $\beta_S$ and $\beta_R$ are determined differently independently of each other, the thrust force $F_{SS}=F_S \cdot \tan \beta_S$ and the thrust force $F_{RS}=F_R \cdot \tan \beta_R$ do not completely offset each other. As a result, the composite planetary gear 20 as a whole is forced by the composite or overall thrust force in one axial direction, and the composite or resultant thrust force is received by the carrier 16 through a thrust bearing 46 or 48.

Each composite planetary gear 20 is rotatably mounted on a pinion shaft 18, with a predetermined amount (e.g., about 1 mm or smaller) of axial clearance or play with respect to the thrust bearings 46, 48, for accommodating or absorbing dimensional errors of the various components of the planetary gear device 10. Upon application of a torque to the planetary gear device 10 during power transmission through the power transmitting system, the composite planetary gear 20 is axially moved to an appropriate one of its opposite axial ends by the above-indicated composite thrust force. Since the specifications of the large- and small-diameter pinions 26, 28 are determined independently of each other, an axial movement of one of the composite planetary gears 20 will cause relative rotation of the sun gear 14 and the ring gear 24. Consequently, unless all of the composite planetary gears 20 are synchronously moved in the axial direction by the same distance, the gears 20 are prevented from smoothly meshing the sun gear 14 and ring gear 24. In other words, non-synchronous axial movements of the gears 20 will cause undesirable contacts of the teeth at the back faces, or sticking of the teeth, whereby the operating noise of the gears 20 is increased, and the power transmitting efficiency and strength of the planetary gear device 10 are adversely influenced. In this respect, it is difficult manufacture the planetary gear device 10 such that all the composite planetary gears 20 have the same amount of axial clearance or play. This means that after one of the composite planetary gears 20 is brought into abutting contact with the carrier 16 through the thrust bearing 46, 48, the other composite planetary gears 20 are no longer axially movable toward the thrust bearing 46, 48, and the thrust forces of these gears 20 are not received by the carrier 16 and should be received by the mating sun and ring gears 14, 24, whereby the above-indicated problems are encountered.

SUMMARY OF THE INVENTION

It is therefore an object of the present invention to provide a planetary gear device which includes a plurality of composite planetary gears each having a large- and a small-diameter pinion that are formed integrally with each other and arranged in the axial direction, and which are adapted to be free from a thrust force and are axially movable independently of each other for smooth engagement with mating gears, even in the presence of helix angles of teeth of the pinions.

It is a second object of this invention to provide a power transmitting system which includes such planetary gear device connected to a differential gear device.

The first object indicated above may be achieved according to a first aspect of the present invention, which provides a planetary gear device including a first gear, a second gear, a carrier, and a plurality of composite planetary gears each having a large-diameter pinion and a small-diameter pinion that are formed integrally with each other and arranged in an axial direction thereof, the composite planetary gears being mounted rotatably on respective pinion shafts such that the composite planetary gears are axially movable over predetermined distances due to axial plays, the pinion shafts being supported by the carrier such that the pinion shafts are disposed around an axis of the carrier, the large-diameter pinions and the small-diameter pinions of the composite planetary gears meshing with the first and second gears, respectively, each of the first and second gears and the large-diameter and small-diameter pinions consisting of a helical gear whose teeth have a helix angle with respect to an axis thereof, wherein the large-diameter and small-diameter pinions have the same direction of helix and the same amount of lead.

In the planetary gear device of the present invention constructed as described above, the composite planetary gears can be axially moved independently of each other while these gears are rotated about their axes, even when the first and second gears are held stationary, because the teeth of the large-diameter pinion and the teeth of the small-diameter pinion are twisted in the same direction with respect to the gear axes and have the same amount of lead. If the teeth of the large-diameter pinion have a left-hand helix, for instance, the teeth of the small-diameter pinion also have a left-hand helix. Therefore, the individual composite gears can be axially moved freely and independently of each other to respective axial positions within the distances of the axial plays or clearances, which axial positions permit smooth and adequate meshing or engagement of the teeth of the pinions with the teeth of the first and second gears. Thus, the present arrangement prevents inadequate engagement of the teeth of the pinions and the first and second gears due to dimensional errors of the carrier and the other components of the planetary gear device. Namely, the present planetary gear device assures consistently adequate and smooth tooth engagement of the pinions of the composite planetary gears with the first and second gears, thereby avoiding otherwise possible increase in the operating noise and deterioration of the power transmitting efficiency of the device.

The present arrangement wherein the large- and small-diameter pinions have the same helix direction and the same lead is further advantageous in that the two thrust forces acting on the two pinions in the opposite directions due to the helix angles are substantially equal to each other and substantially offset each other. Accordingly, the required mechanical strength and rigidity of the carrier which supports the composite planetary gears are reduced, and the planetary gear device can be simplified in construction and manufactured at a reduced cost. Further, the present arrangement eliminates a need of providing thrust bearings between the composite planetary gears and the carrier. It is also noted that since the carrier is free from thrust forces transferred from the pinions and is therefore protected against deflection or deformation due to such thrust forces, the present planetary gear device maintains a high degree of parallelism between the composite planetary gears and the first and second gears, which permits adequate meshing or engagement of the teeth of the pinions and gears, resulting in reduction in the operating noise and improvement in the power transmitting efficiency.

The first and second gears may be a sun gear and a ring gear, respectively. The planetary gear device may include a pair of thrust bearings fixed to the carrier, so that the composite planetary gears are disposed between and axially positioned by the pair of thrust bearings such that the thrust bearings and opposite axial ends of each composite planetary gear cooperate to define a predetermined amount of axial clearance or play which provides a corresponding one of the predetermined distances.

The carrier may have a portion which is radially inwardly of the small-diameter pinions of the composite planetary gears and which constitutes a part of a housing of a differential gear device which is rotatable with the carrier about the axis of the carrier.

The second object indicated above may be achieved according to another aspect of the present invention, which provides a power transmitting system for an electric vehicle, having a motor shaft, a planetary gear device connected to the motor shaft, a differential gear device operatively connected to the planetary gear device and to right and left wheels of the vehicle, the planetary gear device including a first gear, a second gear, a carrier, and a plurality of composite planetary gears each having a large-diameter pinion and a small-diameter pinion that are formed integrally with each other and arranged in an axial direction thereof, the composite planetary gears being mounted rotatably on respective pinion shafts such that the composite planetary gears are axially movable over predetermined distances due to axial plays, the pinion shafts being supported by the carrier such that the pinion shafts are disposed around an axis of the carrier, the large-diameter pinions and the small-diameter pinions of the composite planetary gears meshing with the first and second gears, respectively, each of the first and second gears and the large-diameter and small-diameter pinions consisting of a helical gear whose teeth have a helix angle with respect to an axis thereof, wherein the large-diameter pinion and the small-diameter pinion have the same direction of helix and the same amount of lead.

The power transmitting system according to the second aspect of the invention provides the same advantage as described above with respect to the planetary gear device.

Where the first gear consists of a sun gear splined to the motor shaft, the carrier may have a portion which is radially inwardly of the small-diameter pinions of the composite planetary gears and which constitutes a first part of a housing of the differential gear device which is rotatable with the carrier about the axis of the carrier. In this case, a first and a second power transfer shaft which are connected to the right and left wheels of the vehicle may be disposed such that the first power transfer shaft extends through the motor shaft and the first part of the housing of the differential gear device, while the second power transfer shaft extends through a second part of the housing remote from the first part. The first power transfer shaft is rotatable relative to the motor shaft, and the second power transfer shaft is aligned with the first power transfer shaft and is rotatable relative to the housing. Each of the first and second power transfer shafts is connected at its one end to one or the other of the right and left wheels and at the other end to an appropriate gear of the differential gear device.

The above arrangement is effective to reduce the required overall size of the power transmitting system in the axial direction. This is advantageous particularly when the system is oriented such that the axis of the system extends in the transverse direction of the electric vehicle.

BRIEF DESCRIPTION OF THE DRAWINGS

The above and optional objects, features, advantages and technical significance of the present invention will be better understood and appreciated by reading the following detailed description of a presently preferred embodiment of the invention, when considered in connection with the accompanying drawings, in which.

DETAILED DESCRIPTION OF THE PREFERRED EMBODIMENT

Figure 1:
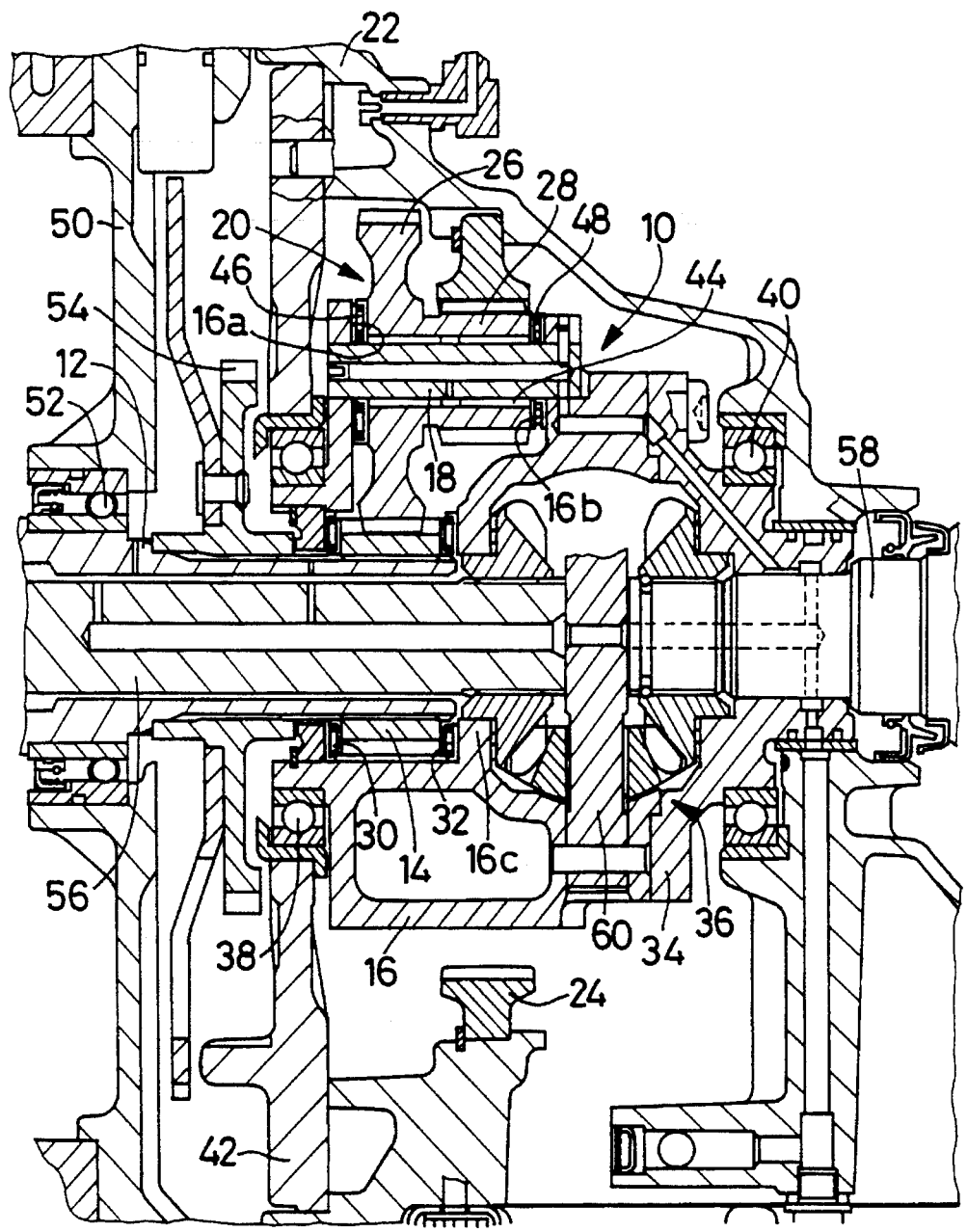
FIG. 1 is a fragmentary elevational view in cross section of a power transmitting system incorporating one embodiment of a planetary gear device of the present invention.
Figure 2:
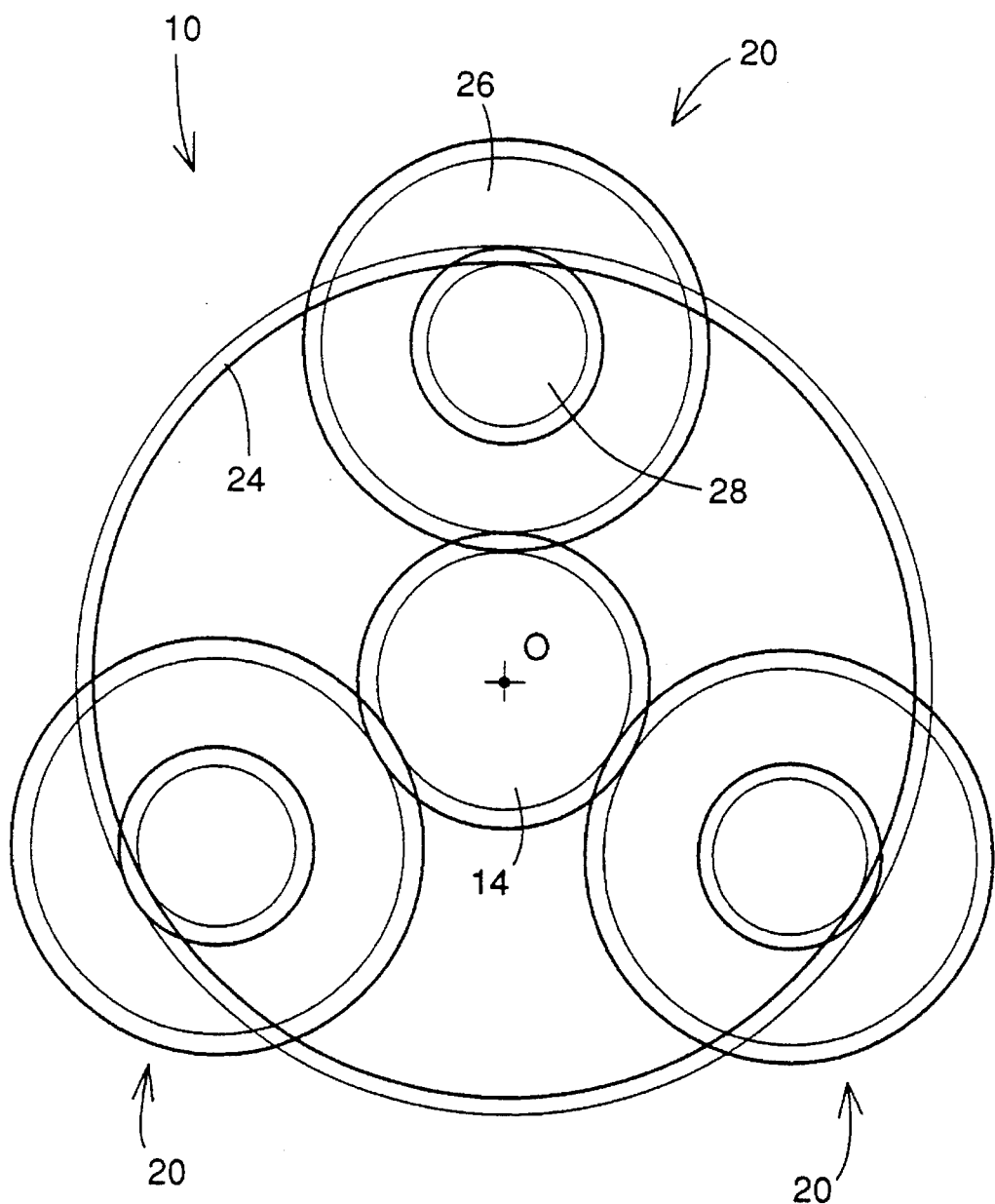
FIG. 2 is a view indicating mutually meshing gears of the planetary gear device of FIG. 1.

Referring to FIGS. 1 and 2, there will be described in detail the planetary gear device 10 constructed according to one embodiment of the present invention.

In the planetary gear device 10, the sun gear 14 is disposed for alignment with a centerline O of the device 10, and is splined with the hollow motor shaft 12. The carrier 16 have a pair of thrust bearings 30, 32 fixed thereto, and the sun gear 14 is axially positioned by and between these thrust bearings 30, 32. To the carrier 16, there is secured a differential cover 34 such that the differential cover 34 cooperates with the carrier 16 to define a space in which the differential gear device 34 of a bevel gear type is accommodated. A unitary assembly of the carrier 16 and the differential cover 34 is supported by a housing 22 of the device 10 through a pair of bearings 38, 40 fixed thereto, such that the assembly 16, 34 is rotatable about the centerline O and is axially immovable relative to the housing 22. The bearing 38 is supported by a gear cover 42 secured to the housing 22. The three pinion shafts 18 are secured to the carrier 16 such that the pinion shafts 18 are parallel to the centerline O and arranged equiangularly around the centerline O. Each of the three composite planetary gears 20 is rotatably mounted on the corresponding pinion shaft 18 via a needle bearing 44. An amount of axial movement of each composite planetary gear 20 is limited by the two thrust bearings 46, 48 fixed to the carrier 16. To absorb inevitable dimensional errors and positioning errors of the components of the device 10, there is provided a suitable amount of axial clearance, about 1 mm or smaller, for example, between the thrust bearings 46, 48 and the opposite axial ends of the composite planetary gear 20. In other words, the axial distance between the two thrust bearings 46, 48 is determined to be slightly larger that the axial dimension of the composite planetary gear 20, so that the composite planetary gear 20 has an axial play corresponding to the axial clearance. The ring gear 24 is also aligned with the centerline O, and is supported by the housing 22 such that the ring gear 24 is not rotatable and axially movable relative to the housing 22.

The motor shaft 12 is rotatably supported by a motor housing 50 via a bearing 52, such that the motor shaft 12 is not axially movable relative to the motor housing 50. The housing 22 of the planetary gear device 10 is attached to the motor housing 50 such that the centerline O of the device 10 is aligned with the axis of the motor shaft 12, and such that the sun gear 14 is splined with the motor shaft 12 for rotation with the motor shaft 12. A parking gear 54 is splined under pressure with the motor shaft 12 and is positioned between the gear cover 42 and the motor housing 50. Power transfer shafts 56, 58 for transferring power to respective right and left drive wheels of the vehicle are inserted through the hollow motor shaft 12 and the differential cover 34, respectively, rotatably relative to these shaft and cover 12, 34. These power transfer shafts 56, 58 are splined at their corresponding ends with respective bevel gears of the differential gear device 36, so that the shafts 56, 58 are rotated with the bevel gears.

Figure 3:
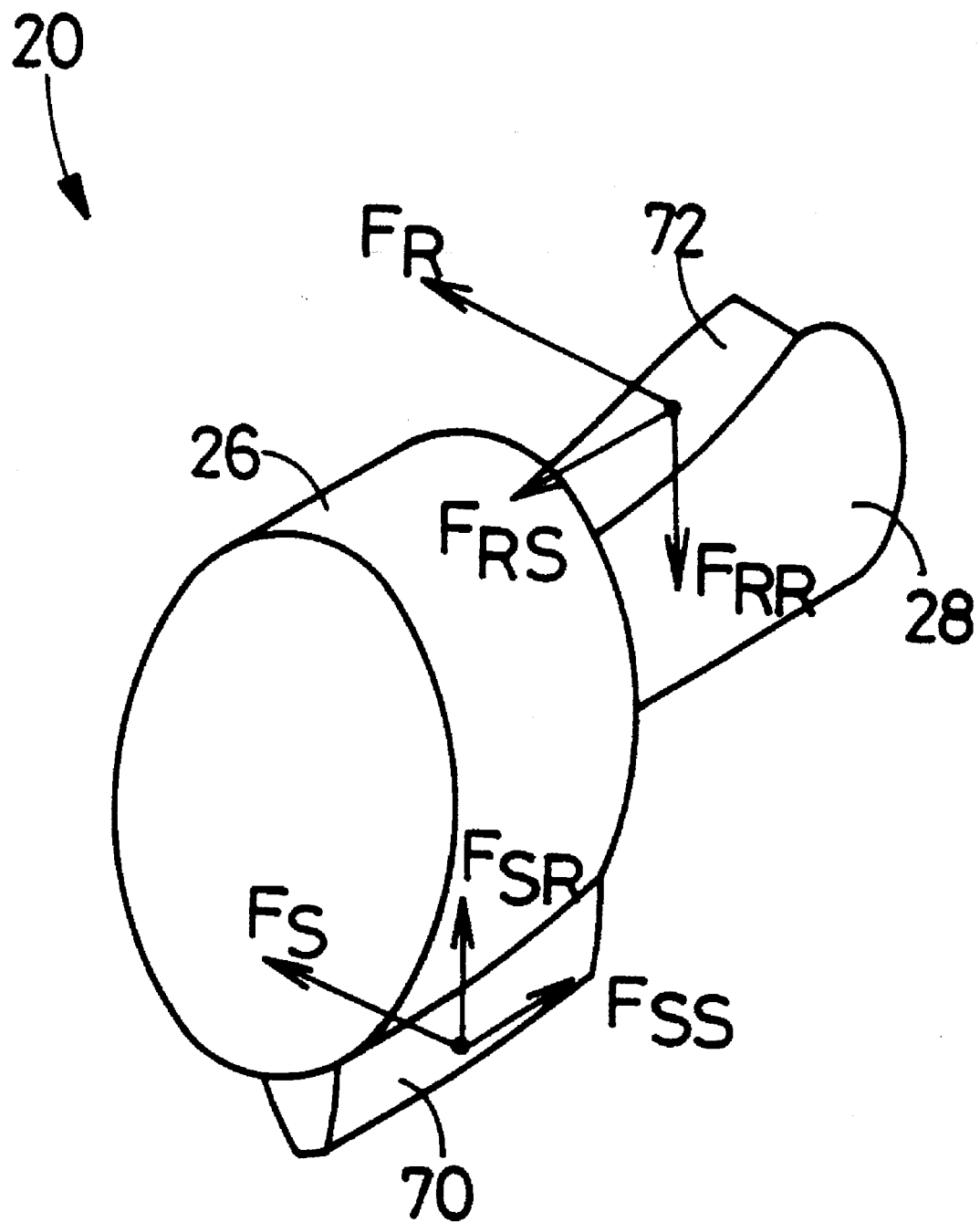
FIG. 3 is a perspective view schematically indicating the profiles of teeth of pinions of each composite pinion gear in the planetary gear device of FIG. 1.

Referring to the perspective view of FIG. 3, there will be described forces which act on each composite planetary gear 20 when the gear 20 is rotated by the motor shaft 12 in the counterclockwise direction as seen in the right direction (from the left toward the right) of FIG. 1, that is, when the planetary gear device 10 is operating to run the vehicle in the forward direction. In FIG. 3, only one tooth 70 of the pinion 26 and only one tooth 72 of the pinion 28 are shown, in the interest of simplicity. The teeth 70 of the large-diameter pinion 26 and the teeth 72 of the small-diameter pinion 28 both have a left-hand helix, and have the same amount of lead. When the motor shaft 12 and the sun gear 14 are rotated counterclockwise, the thrust force $F_{SS}$ acts on the large-diameter pinion 26 meshing with the sun gear 14, in the right axial direction as seen in FIG. 1, due to the left-hand helix of the teeth 70. On the other hand, the thrust force $F_{RS}$ acts on the small-diameter pinion 28 meshing with the ring gear 24, in the left axial direction as seen in FIG. 1, due to the left-hand helix of the teeth 72. At the same time, a radial force $F_{SR}$ acts on the large-diameter pinion 26 in the radially inward direction, due to a pressure angle of the teeth 70, while a radial force $F_{RR}$ acts on the small-diameter pinion 28 in the radially inward direction, due to a pressure angle of the teeth 72. The thrust force $F_{SR}$ is represented by $F_S \cdot \tan \alpha_S$, where "$F_S$" represents a force which is transferred from the sun gear 14 to the teeth 70 of the pinion 26 in the circumferential direction of the pinion 26, and "$\alpha_S$" represents the pressure angle of the teeth 70. The thrust force $F_{SS}$ is represented by $F_S \cdot \tan \beta_S$, where "$\beta_S$" represents the helix angle of the teeth 70. The thrust force $F_{RR}$ is represented by $F_R \cdot \tan \alpha_R$, where "$F_R$" represents a reaction force which is transferred from the ring gear 24 to the teeth 72 of the pinion 28 in the circumferential direction of the pinion 28, and "$\alpha_R$" represents the pressure angle of the teeth 72. The thrust force $F_{RS}$ is represented by $F_R \cdot \tan \beta_R$, where "$\beta_R$" represents the helix angle of the teeth 72.

Figure 4:
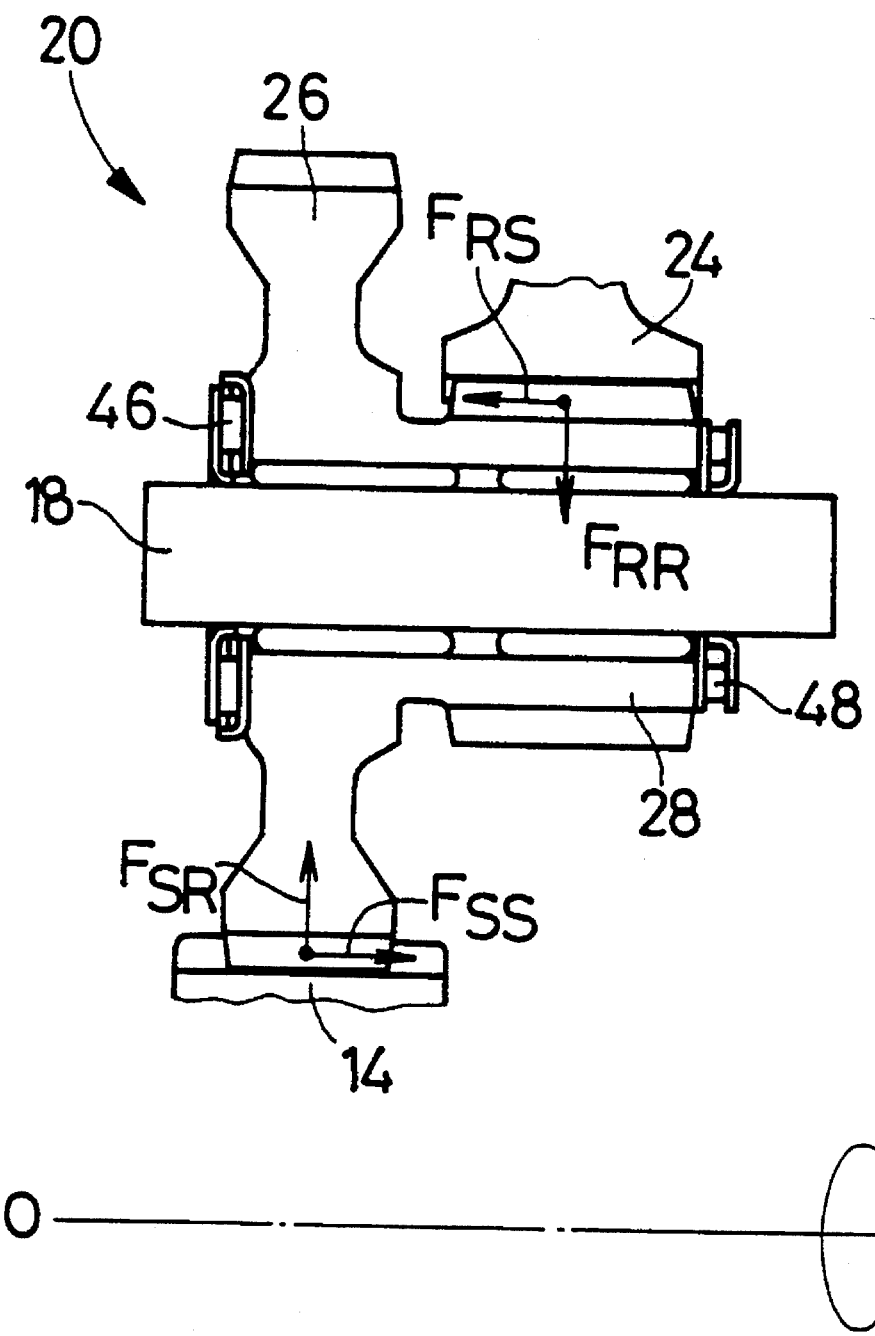
FIG. 4 is a view showing forces which act on each pinion of the composite planetary gear of FIG. 3 in the axial and radial direction.

FIG. 4 indicates the forces $F_{SR}$, $F_{SS}$, $F_{RR}$ and $F_{RS}$ described above. The radial forces $F_{SR}$ and $F_{RR}$ which are generated due to the pressure angles of the teeth 70, 72 act as a moment that rotates the composite planetary gear 20 in the clockwise direction around a centerline normal to the plane of FIG. 4, while the thrust forces $F_{SS}$ and $F_{RS}$ which are generated due to the helix angles of the teeth 70, 72 act as a moment that rotates the composite planetary gear 20 in the counterclockwise direction around the centerline normal to FIG. 4. Hence, these two moments offset each other, and the composite or overall moment which acts on the gear 20 is relatively small. Accordingly, the amount of local uneven wear of the pinion shaft 18 and the amount of deformation of the carrier 16 which supports the pinion shaft 18 are reduced, whereby the durability of the pinion shaft 18 and carrier 16 is improved. The reduced amount of deformation of the carrier 16 permits a relatively high degree of parallelism of the pinion shaft 18 with the centerline O or the axes of the sun and ring gears 14, 24, which assures correct engagement of the pinions 26, 28 with the sun and ring gears 14, 24, and reduced operating noise of the planetary gear device 10. In the present device 10 as described above, one of the large- and small-diameter pinions 26, 28 of each composite planetary gear 20 engages the ring gear 24 while the other of the pinions 26, 28 engages the sun gear 14, and the directions of the helix of the teeth 70, 72 of the pinions 26, 28 are determined so that the thrust forces generated due to the helix angles act in the axially opposite directions toward each other so as to offset each other, whereby the corresponding moments around the centerline normal to the axis of the gear 20 (normal to the plane of FIG. 4) ,offset each other so as to reduce the overall moment. In FIG. 4, hatching is omitted to clearly show the arrows indicating the directions of the forces.

In the present embodiment, the thrust force $F_{SS}$ is equal the thrust force $F_{RS}$, since the lead of the teeth 70 of the large-diameter pinion 26 is equal to that of the teeth 72 of the small-diameter pinion 28. That is, substantially the same amounts of torque T act on the pinions 26, 28 in the opposite directions. The torque T is represented by the following equation (1):

$$T = r_S \cdot F_S = r_R \cdot F_R \tag{1}$$

where, $r_S$: radius of the pinion 26

$r_R$: radius of the pinion 28

Figure 5:
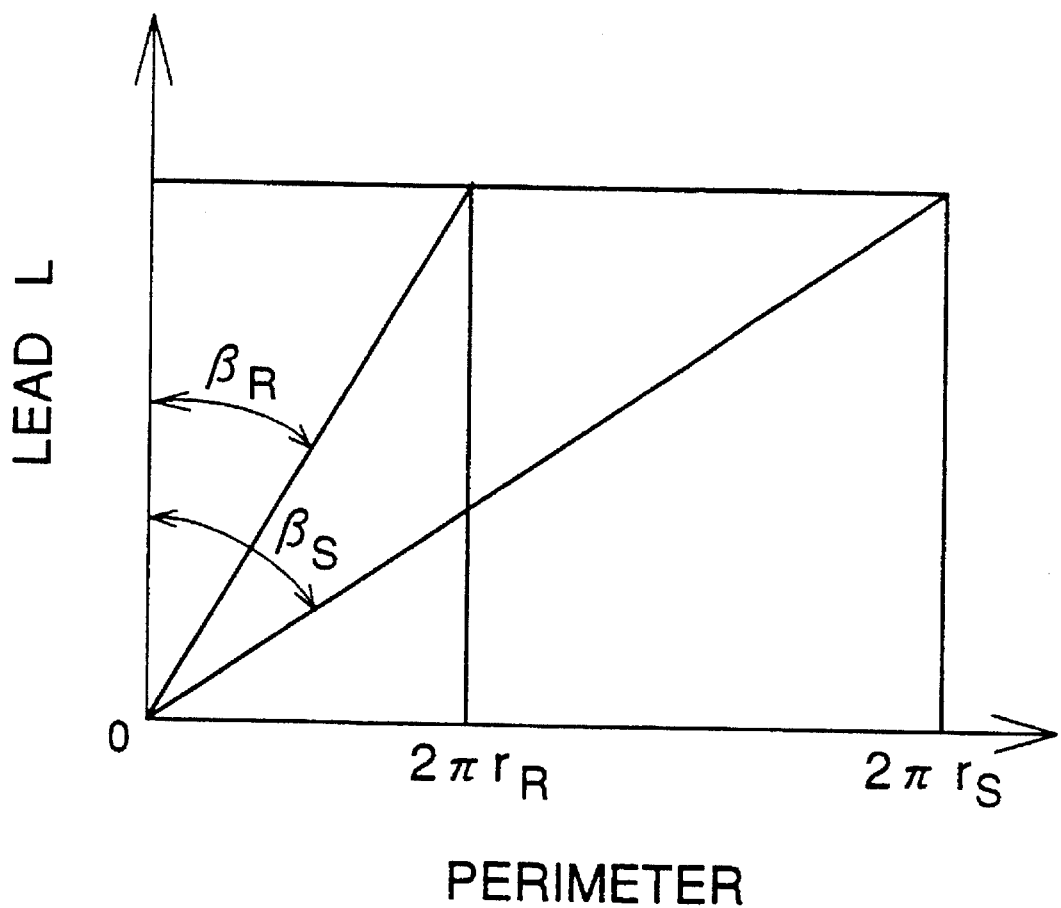
FIG. 5 is graph for explaining relationships between lead L, helix angle $b_S$, $b_R$, and radius $r_S$, $r_R$ of the pinions of the composite planetary gear of FIG. 3.

The thrust forces FSS and FRS are represented by the following equations (2) and (3), respectively, according to a relationship as indicated in FIG. 5:

$$F_{SS} = F_S \cdot \tan \beta_S = F_S \cdot (2\pi r_S/L) = T \cdot (2\pi/L) \tag{2}$$

$$F_{RS} = F_R \cdot \tan \beta_R = F_R \cdot (2\pi r_R/L) = T \cdot (2\pi/L) \tag{3}$$

where,

L: lead of the teeth 70, 72

Thus, the forces $F_{SS}$ and $F_{SR}$ are equal to each other. Therefore, the overall thrust force acting on the composite planetary gear 20 is substantially zero, and the required strength and rigidity of the carrier 16 supporting the gear 20 are reduced, and the planetary gear device 10 can be made simpler in construction and is available at a reduced cost. Further, the deflection or deformation of the carrier 16 due to the thrust force is eliminated, and the parallelism between the axis of the pinion shaft 18 and the axes O of the sun and ring gears 14, 24 is maintained at a relatively level, enabling the teeth 70, 72 of the pinions 26, 28 to correctly and smoothly engage the sun and ring gears 14, 24, and thereby assuring reduced operating noise and improved power transmitting efficiency of the planetary gear device 10. Since substantially no axial load acts on the thrust bearings 46, 48, these bearings 46, 48 may be replaced by less expensive washers. The graph of FIG. 5 indicates the relationship among perimeter or circumference $2\pi r_S$, $2\pi r_R$ of the pinions 26, 28, helix angles $\beta_S$, $\beta_R$ of the teeth 70, 72 and lead L of the teeth 70, 72.

Since the lead L of the large-diameter pinion 26 is equal that of the small-diameter pinion 28, the individual composite planetary gears 20 can be axially moved independently of each other while being rotated about their axes while the sun gear 14 and the ring gear 24 are held stationary. Therefore, upon application of a torque to the planetary gear device 10, the composite planetary gears 20 are moved to respective axial positions within the distances of the axial plays or clearances, which axial positions permit smooth and adequate engagement of the teeth 70, 72 of the pinions 26, 28 with the teeth of the sun and ring gears 14, 24.

Thus, the present arrangement prevents inadequate engagement of the teeth 70, 72 of the pinions 26. 28 and the sun and ring gears 14, 24 due to dimensional errors of the carrier 16 and the other components, such as dimensional error of end faces 16a, 16b of the carrier 16. Thus, the present planetary gear device 10 assures consistently adequate and smooth tooth engagement of the pinions 26, 28 of the composite planetary gears 20 with the sun and ring gears 14, 24, thereby avoiding otherwise possible increase in the operating noise and deterioration of the power transmitting efficiency of the device. It is noted that while the overall or composite thrust force acting on the composite planetary gear 20 is substantially zero in theory as described above, the thrust force is not actually completely zero in the actual planetary gear device 10, and each composite planetary gear 20 is in engagement or mesh with the sun and ring gears 14, 24, with the opposite axial ends of the gear 20 held in abutting contact with the end face 16a or 16b.

As described above, the principle of the present invention requires the teeth 70, 72 of the pinions 26, 28 of each composite planetary gear 20 to have the same direction of helix and the same amount of lead. The helix angles $\beta_S$ and $\beta_R$ of the teeth 70, 72 are determined depending upon the lead L and the radii $r_S$, $r_R$ of the pinions 26, 28, while the width and thickness of the teeth 70, 72, module and other specifications of the pinions 26, 28 are determined as needed, depending upon the required strength and tooth contact ratio. The composite planetary gear 20 may be manufactured by first forming the large-diameter and small-diameter pinions 26, 28 separately, and then uniting these pinions 26, 28 into a one-piece structure by welding, for example. Alternatively, the composite planetary gear 20 may be formed by generating the teeth 70, 72 on a one-piece blank, using a two-stage pinion cutter guided by the same helical guide. In the latter case, the number ZH of teeth of the pinion cutter is determined according to the following equation (4), and the number ZG of the teeth 70, 72 of the pinions 26, 28 can be calculated according to the following equation (5):

$$ZH = ZG \cdot LH/L \quad (4)$$

$$L = \pi \cdot MN \cdot ZG / \sin \beta \quad (5)$$

where,

L: lead of the pinions 26, 28

LH: lead of the helical guide $\beta$: helix angle of the pinions 26, 28

MN: module (normal to the teeth)

The present embodiment uses the differential gear device 36 of bevel gear type, which is partly built in the planetary gear device. 10, more specifically, accommodated in a space formed radially inwardly of the small-diameter pinions 28 of the three composite planetary gears 20. This arrangement is advantageous in shorting the axial size of the power transmitting assembly including the planetary gear device 10, which is oriented in the direction of width or the transverse direction of the vehicle. In this respect, it is noted that a portion 16c of the carrier 16 of the planetary gear device 10 which functions to position the sun gear 14 extends radially inwardly of the small-diameter pinions 28 and axially toward the large-diameter pinions 26. This portion 16c partly defines the space which accommodates the bevel gear which is splined to the shaft 56. Thus, the differential gear device 36 is partly located within the planetary gear device 10.

While the present invention has been described in detail by reference to the accompanying drawings, it is to be understood that the invention may be otherwise embodied.

In the illustrated embodiment, the ring gear 24 functions as the reaction element so that a rotary motion transferred from the motor shaft 12 to the sun gear 14 is outputted through the carrier 16 to the differential gear device 36 at a predetermined speed reduction ratio. However, the principle of the present invention is equally applicable to a planetary gear device in which the sun gear 12 and the carrier 16 function as the reaction elements, or a planetary gear device adapted such that the output speed is higher than the input speed.

Although the large-diameter and small-diameter pinions 26, 28 mesh with the sun gear 14 and the ring gear 24, respectively, in the illustrated embodiment, the pinions 26, 28 may mesh the ring gear 24 and the sun gear 14, respectively. Further, the present invention is applicable to a planetary gear device in which the large-diameter and small-diameter pinions 26, 28 both mesh with the sun gear 14 or the ring gear 24.

In the illustrated embodiment, the direction of the helix of the teeth 70, 72 of the pinions 26, 28 is determined depending upon the direction of rotation of the sun gear 14 corresponding to the forward running direction of the vehicle, so that the thrust forces $F_{SS}$ and $F_{RS}$ generated due to the helix act in the opposite axial directions toward each other. However, the direction of the helix of the teeth 70, 72 may be determined so that the thrust forces $F_{SS}$ and $F_{RS}$ generated due to the helix act in the opposite axial directions away from each other.

The differential gear device 36 of bevel gear type may be replaced by a differential gear device of planetary gear type. That is, the planetary gear device according to the present invention may be used with a differential gear device of planetary gear device.

It is to be understood that the present invention may be embodied with various other changes, modifications and improvements, which may occur to those skilled in the art, without departing from the spirit and scope of the invention defined in the following claims.

What is claimed is:

1. A planetary gear device including a first gear, a second gear, a carrier, and a plurality of composite planetary gears each having a large-diameter pinion and a small-diameter pinion that are formed integrally with each other and arranged in an axial direction thereof, said composite planetary gears being mounted rotatably on respective pinion shafts such that said composite planetary gears are axially movable over predetermined distances due to axial plays, said pinion shafts being supported by said carrier such that said pinion shafts are disposed around an axis of said carrier, said large-diameter pinions and said small-diameter pinions of said composite planetary gears meshing with said first and second gears, respectively, each of said first and second gears and said large-diameter and small-diameter pinions consisting of a helical gear whose teeth have a helix angle with respect to an axis thereof, wherein the improvement comprises:

said large-diameter and small-diameter pinions having the same direction of helix and the same amount of lead.

2. A planetary gear device according to claim 1, wherein said first gear consists of a sun gear while said second gear consists of a ring gear.

3. A planetary gear device according to claim 1, wherein said plurality of composite planetary gears consist of three composite planetary gears.

4. A planetary gear device according to claim 1, further comprising a pair of thrust bearings fixed to said carrier, said composite planetary gears being disposed between said pair of thrust bearings such that said thrust bearings and opposite axial ends of each said composite planetary gear cooperate to define a predetermined amount of axial play which provides a corresponding one of said predetermined distances.

5. A planetary gear device according to claim 1, wherein a portion of said carrier which is radially inwardly of said small-diameter pinions of said composite planetary gears constitutes a part of a housing of a differential gear device which is rotatable with said carrier about said axis of said carrier.

6. A power transmitting system for an electric vehicle, having a motor shaft, a planetary gear device connected to said motor shaft, a differential gear device operatively connected to said planetary gear device and to right and left wheels of the vehicle, said planetary gear device including a first gear, a second gear, a carrier, and a plurality of composite planetary gears each having a large-diameter pinion and a small-diameter pinion that are formed integrally with each other and arranged in an axial direction thereof, said composite planetary gears being mounted rotatably on respective pinion shafts such that said composite planetary gears are axially movable over predetermined distances due to axial plays, said pinion shafts being supported by said carrier such that said pinion shafts are disposed around an axis of said carrier, said large-diameter pinions and said small-diameter pinions of said composite planetary gears meshing with said first and second gears, respectively, each of said first and second gears and said large-diameter and small-diameter pinions consisting of a helical gear whose teeth have a helix angle with respect to an axis thereof, wherein the improvement comprises:

said large-diameter and small-diameter pinions having the same direction of helix and the same amount of lead.

7. A power transmitting system according to claim 6, wherein said first gear consists of a sun gear splined to said motor shaft, and a portion of said carrier which is radially inwardly of said small-diameter pinions of said composite planetary gears constitutes a first part of a housing of said differential gear device which is rotatable with said carrier about said axis of said carrier.

8. A power transmitting system according to claim 7, further comprising a first power transfer shaft which extends through said motor shaft and said first part of said housing of said differential gear device such that said first power transfer shaft is rotatable relative to said motor shaft, and a second power transfer shaft which extends through a second part of said housing remote from said first part such that said second power transfer shaft is aligned with said first power transfer shaft and is rotatable relative to said housing, one of said first and second power transfer shafts being connected at one end thereof to one of said right and left wheels and the other end to said differential gear device, the other of said first and second second power transfer shafts being connected at one end thereof to the other of said right and left wheels and the other end to said differential gear device.

* * * * *